US012423652B2

(12) United States Patent
Ramos

(10) Patent No.: US 12,423,652 B2
(45) Date of Patent: Sep. 23, 2025

(54) MOBILE AUTOMATED INVENTORY CONTAINER BIN AND SYSTEM

(71) Applicant: Steven Ramos, Fontana, CA (US)

(72) Inventor: Steven Ramos, Fontana, CA (US)

( * ) Notice: Subject to any disclaimer, the term of this patent is extended or adjusted under 35 U.S.C. 154(b) by 0 days.

(21) Appl. No.: 18/652,005

(22) Filed: May 1, 2024

(65) Prior Publication Data

US 2024/0281762 A1   Aug. 22, 2024

Related U.S. Application Data

(63) Continuation of application No. 17/146,017, filed on Jan. 11, 2021, now Pat. No. 12,026,661.

(60) Provisional application No. 62/958,998, filed on Jan. 9, 2020.

(51) Int. Cl.
| | |
|---|---|
| *G06Q 10/00* | (2023.01) |
| *G06K 19/07* | (2006.01) |
| *G06Q 10/0833* | (2023.01) |
| *G06Q 10/087* | (2023.01) |

(52) U.S. Cl.
CPC ....... *G06Q 10/087* (2013.01); *G06K 19/0723* (2013.01); *G06Q 10/0833* (2013.01)

(58) Field of Classification Search
CPC ............. G06Q 10/087; G06Q 10/0833; G06K 19/072; G06K 19/0716
See application file for complete search history.

(56) References Cited

U.S. PATENT DOCUMENTS

2005/0258961 A1\* 11/2005 Kimball ............... G06Q 20/203
340/572.1
2007/0296596 A1\* 12/2007 Moore ............... G06K 7/10336
340/572.7

\* cited by examiner

*Primary Examiner* — Rokib Masud
(74) *Attorney, Agent, or Firm* — Ruggiero McAllister & McMahon LLC

(57) ABSTRACT

Systems and methods are provided for automatic inventory tracking such that items placed into a container/bin are automatically tracked and wherein the container/bin is moveable. The system including automatic tracking of items removed from the container/bin and automatic tracking of the container/bin. The system may further include audio/visual indications when an asset tag is validated.

12 Claims, 7 Drawing Sheets

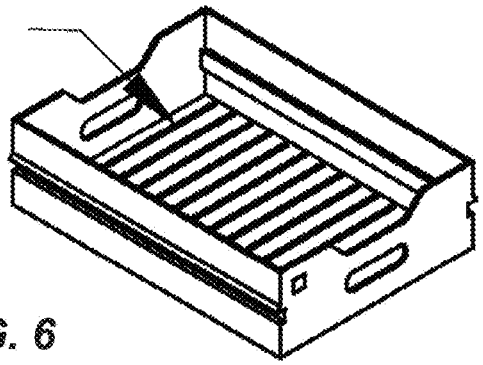
FIG. 6
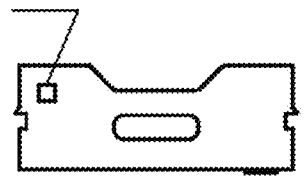
FIG. 7
FIG. 8

MOBILE AUTOMATED INVENTORY CONTAINER BIN AND SYSTEM

CROSS REFERENCE TO RELATED APPLICATIONS

This application is a Continuation of U.S. application Ser. No. 17/146,017, filed Jan. 11, 2021, the entire contents of all of which are incorporated herein by reference, which claims the benefit of U.S. Application No. 62/958,998, filed Jan. 9, 2020 the contents of which are incorporated by reference herein.

FIELD OF THE INVENTION

The invention relates to an inventory tracking system, and more particularly, to a system and method for tracking items placed into and removed from a container that is loaded onto a movable cart.

BACKGROUND OF THE INVENTION

The need to provide inventory control and tracking has been an issue for companies for many years. Various systems have been provided to account for inventory tracking with varying degrees of success. One method has been to count items placed on shelves or within bins located on shelves, which information is input onto a ledger. However, manual processes are labor intensive and are subject to inaccuracies as items in inventory are used/removed but not indicated as being removed from the shelf and/or bin. This results in an inaccurate count of the current inventory and does not properly account for inventory that has been used.

Some systems have sought to address this problem by the use of bar codes that are affixed to the item to be scanned by a hand-held scanner. However, this type of system suffers from the same problems as described above as items can be taken that are not scanned or placed in locations and not scanned in such that they are not easily locatable.

Other systems use Radio Frequency Identification (RFID) or Near-Field Communication (NFC) devices, which are affixed to the item to be scanned. In one configuration, a hand-held scanner is used to scan the items, which again suffers from the same problems as previously discussed. In another configuration, a fixed mounted RFID or NFC reading system is positioned on the shelf where the items to be tracked are stored. However, a drawback of this type of system is that a reading system is needed for each shelf to provide granularity needed to quickly find an item.

None of these above-described system function well with a shelf to container/bin system tracking system. For example, they are not capable of tracking items that are removed from a shelf and are then placed within a moveable container/bin. There is no ability to track when items enter or leave the container/bin. In the manual scanning configuration, an individual must manually operate the handheld RFID or NFC reader, which only functions to log items at the time of the manual scan. This manual scan could happen after the fact or could be missed entirely.

In the aircraft provisioning industry, items are routinely pulled from storage locations and placed in containers/bins that are moveable and can subsequently be loaded onto an airplane. There is currently no satisfactory tracking system that tracks the locations of items that are placed into a container/bin that is then moved onto a plane.

During travel events, travelers or passengers then have the opportunity to purchase the items placed into the containers/bins. For example, a passenger on an airline flight may have the option to purchase food items during the flight. The food items may be fresh/perishable or boxed, shelf stable items. Other items include non-food items such as blankets, pillows, gift items and the like. Manually scanning items that are removed from the container/bin as they are purchased is subject to error as the individual distributing the item(s) may forget to scan an item, or an item may be purposefully removed from the container/bin without being scanned and go missing.

SUMMARY OF THE INVENTION

What is desired is a system and method for dynamically monitoring the location of items that are placed into a container/bin that is movable.

It is further desired to provide a system and method for automatically tracking items that are placed into and removed from a container/bin and dynamically monitoring the location of the container/bin.

It is still further desired to provide a system and method for automatically tracking an item from a storage location to a container/bin and then from the container/bin when the item is sold during a travel event.

In one configuration, an inventory tracking system is provided that automatically logs the location of items that are moved from a storage location to a movable container/bin, and then are removed from the container. In another configuration, the inventory tracking system automatically reads the location of items in storage and in the container such that an individual may locate and item in a particular container as the system actively reads whether the item is currently in the container.

Additionally, it is understood that the container itself can be automatically tracked to monitor the movement of the container throughout the product life cycle. This self-contained unit as variously illustrated in the attached drawings.

In yet another configuration, the system is adapted to dynamically link with an inventory/stock count system that is used to supply travel related events such as, airplanes, trains, buses and so on.

In one implementation, a primary container may be provided with a wireless device that could utilize/read RFID and or a NFC with an asset tracking and authentic tag. When tagged items are place within or removed from the primary container, the wireless device will automatically read/inventory the items. A secondary container may also include a wireless device and further include an embedded antenna to boost the signal of tagged items placed within or removed from the secondary container. It is contemplated that the power level of the antenna can vary depending on the specific application, the items to be tracked, the configuration and implementation of the system and so on.

In one configuration, a primary inventory container can be used in connection with one or more secondary containers. In an implementation when used with a cart or trolley such as a food and drink cart used on an airplane, the primary inventory container can be used in connection with a number (e.g., three) of secondary containers. One of skill in the art will understand however, that any number of secondary containers may be used as desired or needed.

Preferably the primary and secondary shelf inventory containers can be linked via an asset tag that will provide authentication to a connected wireless device or reader. Once all shelf inventory containers are linked and authenticated to the wireless device associated with the primary container, an LED may turn on (e.g., turn green). Conversely, if an unauthenticated shelf inventory container is introduced into the link system, the asset tag could indicate such by displaying a red color and/or emitting a sound indicating an error. Once the unauthenticated shelf inventory container is removed from the read range of the reader, it will turn off.

The above configuration would prevent a secondary container that is authenticated to the primary container from being removed from the cart to which it is associated. As an example, a first food trolley on an airplane is programmed with a primary and a number of secondary containers. A second food trolley on the same airplane is also programmed with a primary and a number of secondary containers. If a flight attendant switched secondary inventory containers in the first and second trolleys, this would cause the red LED to illuminate on the cart as the secondary containers were authenticated to a different primary container. Alternatively, if all the primary and the secondary containers are all properly associated with the cart, the green LED would illuminate providing an easy to see confirmation that the trolly or cart is setup properly.

In one configuration a computer (e.g. a server) having a storage and coupled to a network is provided that includes software executing thereon and receiving data relating to the items. For example, a computer may automatically receive updated tracking information when items are placed into a container. Additionally, the computer may automatically receive updated tracking information when items are removed from the container. Still further, the location of the container/bin may be monitored.

It is further contemplated that a visual indication can be provided on the computer showing that the correct primary and secondary containers are all positioned in the correct trolly or cart. If a primary or secondary container are not placed into the proper cart, an indication could be provided to the computer indicating the problem.

For this application the following terms and definitions shall apply:

The term "data" or "information" as used herein means any indicia, signals, marks, symbols, domains, symbol sets, representations, and any other physical form or forms representing information, whether permanent or temporary, whether visible, audible, acoustic, electric, magnetic, electromagnetic or otherwise manifested. The term "data" as used to represent predetermined information in one physical form shall be deemed to encompass any and all representations of the same predetermined information in a different physical form or forms.

The term "network" as used herein includes both networks and internetworks of all kinds, including the Internet, and is not limited to any particular network or inter-network.

The terms "first", "second" and "third" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The terms "process" and "processing" as used herein each mean an action or a series of actions including, for example, but not limited to, the continuous or non-continuous, synchronous or asynchronous, routing of data, modification of data, formatting and/or conversion of data, tagging or annotation of data, measurement, comparison and/or review of data, and may or may not comprise a program.

A travel event is intended to encompass any type of travel on a common carrier in which an individual can obtain items during including for example, an airline flight or on a bus, a train, a ferry or cruise ship, freight carriers and other travel providers.

In one configuration, a system for automatically tracking items to be distributed during a travel event is provided comprising a computer having a database including an inventory of items to be provisioned into a container for the travel event, the computer connected to a network, and a communications module associated with the container and coupled to the computer. The system further comprises a wireless device having a storage and affixed to a container and coupled to the communications module, and a wireless identifier associated with an item that is placed within the container, the wireless identifier having information stored thereon. The system is provided such that when the item is placed into the container, the wireless device automatically communicates with the wireless identifier and the information stored thereon is received by the wireless device, and the wireless device transmits the information to the communications module. Finally, the system is provided such that the communications module transmits the information to the computer, and the software executing on the computer processes the information to update the inventory of items associated with the container for the travel event.

In another configuration, a system for automatically tracking items to be distributed during a travel event is provided comprising a computer having a database including an inventory of items to be provisioned into a first container and a second container for the travel event, the computer connected to a network, and a communications module associated with the first container and coupled to the computer. The system further comprises a first wireless device having a storage and associated with the first container coupled to with the communications module, and a first wireless identifier associated with a first item that is placed within the first container, the wireless identifier having first information stored thereon. The system is provided such that when the first item is placed into the first container, the first wireless device automatically communicates with the first wireless identifier and the first information stored thereon is received by the first wireless device, the first wireless device transmits the first information to the communications module, and the communications module transmits the first information to the computer. The system still further comprises a second wireless device associated with the second container and coupled to the first wireless reader, and a second wireless identifier associated with a second item that is placed within the second container, the second wireless identifier having second information stored thereon. The system is further provided such that when the second item is placed into the second container, the second wireless device automatically communicates with the second wireless identifier and the second information stored thereon is received by the second wireless device, and the second wireless device transmits the second information to the first wireless device. The system is yet further provided such that the first wireless device transmits the second information to the communications module, and the communications module transmits the second information to the computer. Finally, the software executing on the computer processes the first and second information to update the inventory of items associated with the first and second containers respectively for the travel event.

Other objects of the invention and its particular features and advantages will become more apparent from consideration of the following drawings.

BRIEF DESCRIPTION OF THE DRAWINGS

FIG. 6 is an illustration of the secondary container including a wireless device according to FIG. 1.

FIG. 7 is an illustration of the secondary container including a tracker/container synchronization module according to FIG. 1.

FIG. 8 is an illustration of the secondary container including a battery that is wirelessly chargeable according to FIG. 1.

DETAILED DESCRIPTION OF THE INVENTION

Figure 1:
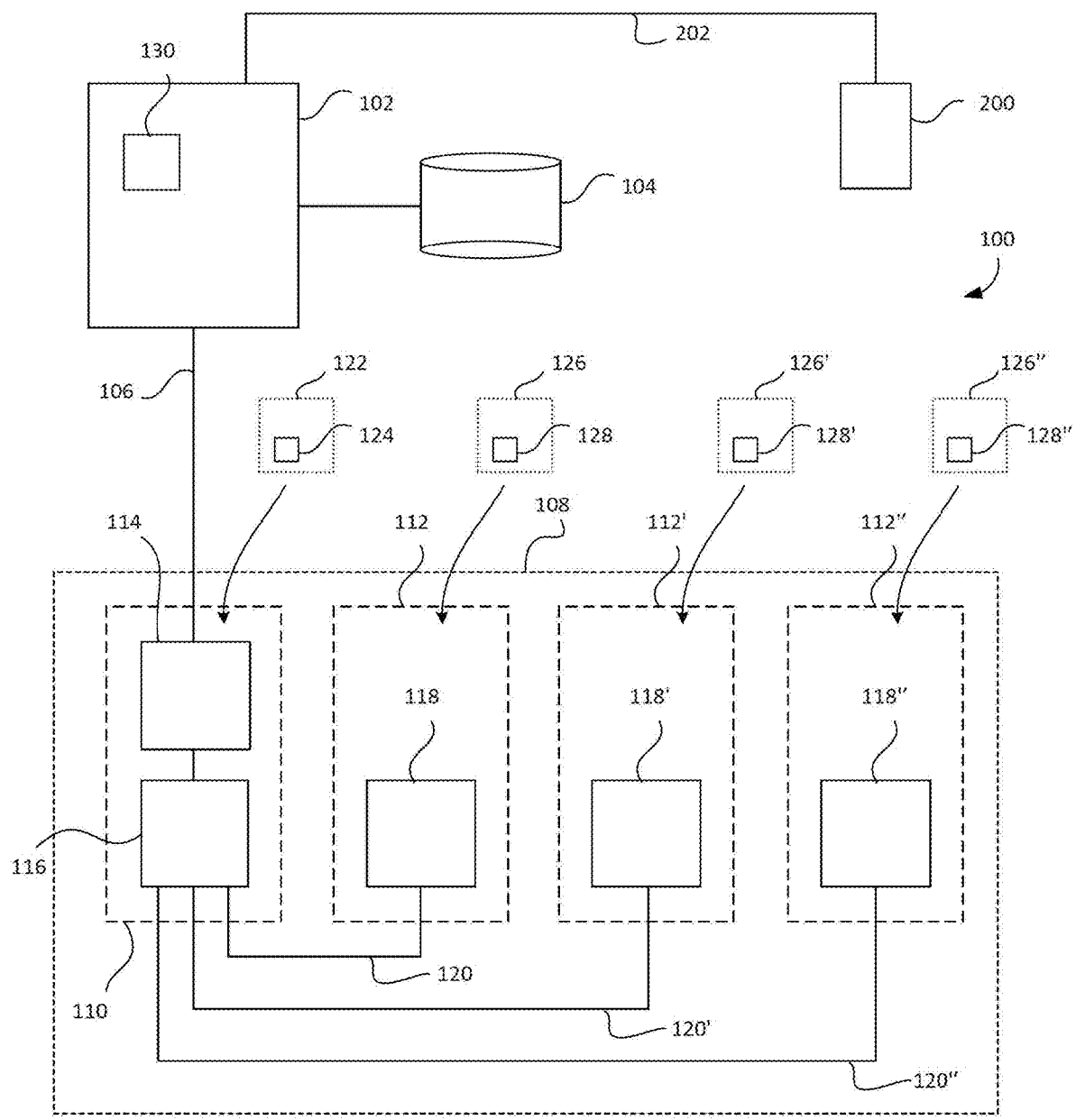
FIG. 1 is a block diagram of one configuration of the invention.

Referring now to the drawings, wherein like reference numerals designate corresponding structure throughout the views.

FIG. 1 is a block diagram of on configuration of the system 100 for automatically tracking items to be distributed during a travel event.

System 100 includes a computer 102 that includes a database or storage 104. The storage may include a list of inventory of items 130 to be provisioned into a primary container 110 and a number of secondary containers 112, 112,' 112" for the travel event. It should be understood that the term "container" or "bin" as used herein is not intended to be limiting but may encompass any structure on which items may be placed or located and does not have to encompass an enclosure or enclosed structure. For example, the tray on a trolly or cart could comprise a container as it is used herein. The computer 102 is connected to the primary container 110 via a network connection 106.

The system further includes a communications module 114 that is associated with the primary container 110 and is coupled to the computer 102. The connection between the communications module 114 and computer 102 is indicated with a line in FIG. 1. It is contemplated that this connection is wireless and may be via, for example but not limited to, the WIFI system on the airplane.

A primary wireless device 116 includes a storage and is associated with the primary container 110. The primary wireless device 116 is coupled to the communications module 114 such that the information or data saved on the storage associated with the primary wireless device 116 may be transmitted to computer 102.

A first item 122 having a first wireless identifier 124 may be placed or positioned within the primary container 110. Upon placement of the first item 122 into the primary container 110, the primary wireless device 116 automatically communicates with the first wireless identifier 124 such that data saved on the first wireless identifier 124 is transmitted to and saved on the storage associated with the primary wireless device 116. This information can be transmitted to computer 102 via communications module 114.

Also depicted in FIG. 1 are secondary containers 112, 112,' 112" each including secondary wireless devices 118, 118', 118" that are associated with the secondary containers 112, 112,' 112" respectively. Each of the secondary wireless devices 118, 118', 118" are coupled to the primary wireless device 116. In one configuration, each of the secondary wireless devices 118, 118', 118" may include an antenna integral to the device. Upon placement of the second item 126, 126', 126" into the secondary containers 112, 112', 112" respectively, the secondary wireless devices 118, 118', 118" automatically communicate with the second wireless identifiers 128, 128', 128" respectively such that data saved on each of the second wireless identifiers 128, 128', 128" is transmitted to the secondary wireless devices 118, 118', 118". The secondary wireless devices 118, 118', 118" in turn, transmit the received data to the primary wireless device 116 where it is saved until it can be uploaded to computer 102 via communications module 114.

It should be noted that while secondary wireless devices 118, 118', 118" are illustrated as connected to primary wireless device 116 via lines in FIG. 1, it is contemplated that the connection is wireless. It is further contemplated that in one configuration, secondary wireless devices 118, 118', 118" are not provided with storage or memory such that the information received is automatically transferred with the wireless connection.

The system 100 provides for automatic inventory tracking as an individual accessing the list of items via, for example, a mobile device 200 via a wireless network connection 202 (e.g., the WiFi on the plane), is presented with a current list of items available for purchase or distribution. In this configuration, the mobile device may be provided as a mobile app that is downloaded and installed on the mobile device 200. As the system is constantly adjusting and keeping track of items in the various containers, the list of items accessed by the user via their mobile device is current.

The system 100 then, automatically monitors items placed into the containers upon provisioning for the travel event to ensure the proper items have been placed into the containers. For example, individuals may pre-order and pre-pay for items. This system ensure that such items are provisioned for the travel event. If a pre-ordered or pre-purchased item is not included in the inventory, the system could provide a warning that the list of items is incomplete.

Among the information that is transferred from the first wireless identifier 124 and the second wireless identifiers 128, 128', 128" to the primary wireless device 116 and the secondary wireless devices 118, 118', 118", is information identifying the associated item. For example, in one configuration each item tagged may include an item description, manufactured date, SKU number, timestamp of placement within the associated container, quantities of particular SKU numbers, temperature, and freshness.

Figure 2:
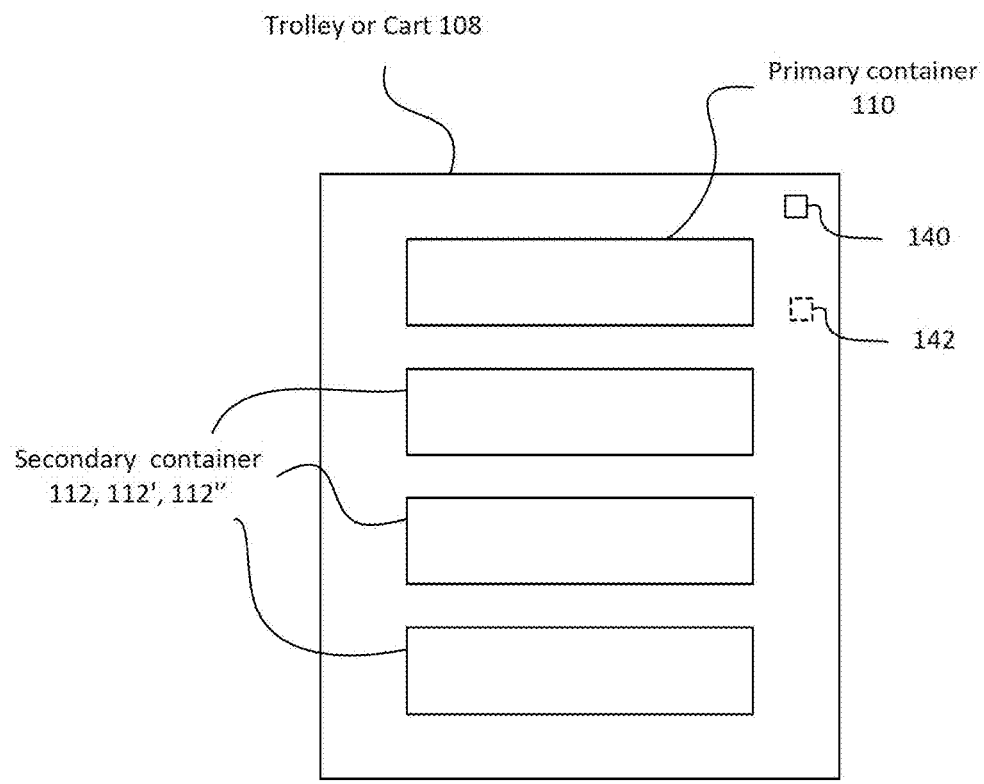
FIG. 2 is a block diagram illustrating the positioning of the containers in the cart according to FIG. 1.

Turning now to FIGS. 1 and 2, an illustration of the front view of a trolly or cart 108 is shown in FIG. 2. The trolly or cart 108 may be any typically movable cart that is used on an airplane, or train or other common carrier. In the configuration shown, the primary container 110 is shown as the first drawer of the cart 108, while the secondary containers 112, 112', 112" are shown below. There is no restriction or limitation on the exact placement of the containers in the cart 108.

Also shown on the front of cart 108 is indication 140. This may be provided in the form of an audio/visual indication. When primary container 110 is associated with cart 108, upon placement of the primary container 110 into the cart 108, the primary wireless device 116 may automatically communicate with a wireless cart identifier 142, which could be positioned anywhere on or in the cart 108. In this way, if the wrong containers (e.g., containers associated with a different cart) are placed into the cart 108, the indication 140 could provide a warning such as showing a red color or giving an audio indication such as a beep or buzz. Alternatively, if the correct containers (those associated with the cart for the travel event) are positioned in cart 108, the indication 140 could provide positive feedback, such as showing a green color. In this way, the contents of the containers is tracked individually and the containers themselves are tracked in connection with the cart in which they are positioned.

Figure 3:
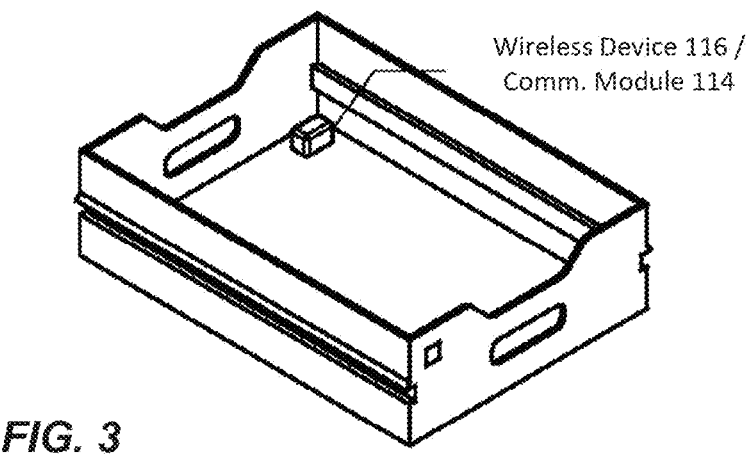
FIG. 3 is an illustration of the primary container including a communication module and a wireless device according to FIG. 1.
Figure 4:
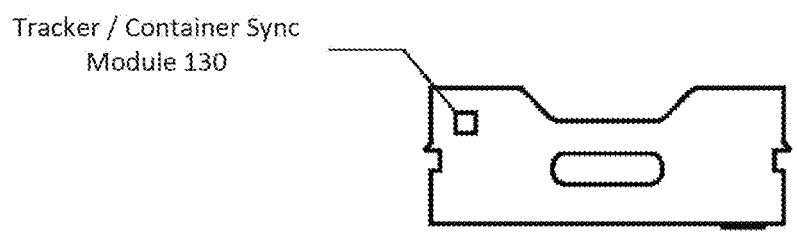
FIG. 4 is an illustration of the primary container including a tracker/container synchronization module according to FIG. 1.
Figure 5:
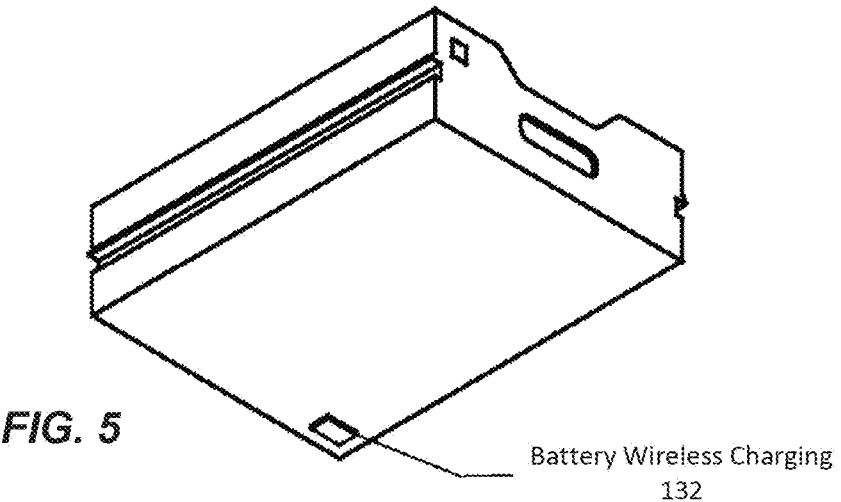
FIG. 5 is an illustration of the primary container including a battery that is wirelessly chargeable according to FIG. 1.

FIGS. 3-5 variously illustrate the primary container 110. FIG. 3 shows the communications module 114 and the primary wireless device 116. While it is not required, in this configuration those two devices are integrated into a single device housing or package. The primary wireless device 116 is conveniently located in the primary container 110 making is close to items that are placed inside for ease of reading and identifying. FIG. 4 illustrates the tracker/container sync module 130, while FIG. 5 illustrates battery wireless charging 132.

FIGS. 6-8 variously illustrate secondary containers 112, 112', 112". FIG. 6 illustrates secondary wireless devices 118, 118', 118". The secondary wireless devices 118, 118', 118" are positioned in the secondary containers 112, 112', 112" respectively to facilitate easy reading of items that are placed inside each container. FIG. 7 illustrates the tracker/container sync module 134, while FIG. 8 illustrates battery wireless charging 136.

In on configuration, the primary wireless device 116 is based on a printed circuit board (PCB), which is a surface mounted diode (SMD) platform with Bluetooth functionality. The SMD RFID module may be encapsulated in an over-mold comprised of a thermoplastic rubber outer shell. In one configuration, the mold is designed to fit the Nordic NORDIC ID NUR-05WL2 or a similar design. The primary wireless device 116 will be placed within the pre-molded body and backfilled with epoxy to create an anti-wicking barrier. Alternatively, the primary wireless device 116 can be pre-molded with a low-density polyethylene to create a hermetically sealed device before over-molding with a thermoplastic outer shell to provide shock and drop protection, as well as water resistance of IP 68.

Additionally, the wireless device encapsulation will include a rechargeable battery that will support, for example, a USB-C port input charging to support rapid charging, reducing wireless device downtime. It may also support wireless charging using, for example, the Qi standard, delivering inductive charging adding an alternative charging method, i.e., charging in the air without the need to have charging cables in the event the originator did not charge the wireless device before the flight.

While the above construction is described in connection with the primary wireless device 116, it is contemplated that the secondary wireless devices 118, 118', 118" may have a similar construction.

The primary wireless device 116 (whether RFID or NFC) may be preprogrammed with data storage capabilities as well as the ability to transfer data in real-time via Bluetooth or IoT. In another configuration, the software in one example, could be based on Nordic ID's RADEA platform. It is further contemplated that the software platform supports mobile applications by tying into passenger flight databases connecting the inventoried item to the passenger's pre-order item inventoried by the system 100. The primary wireless device 116 will connect to the computer 102 to authenticate the containers before receiving items. Additionally, when the primary container 110 is associated with secondary containers 112, 112', 112" within a grouping, the containers will be authenticated to the primary wireless device 116, avoiding any accidental misplacements of the containers.

Figure 9:
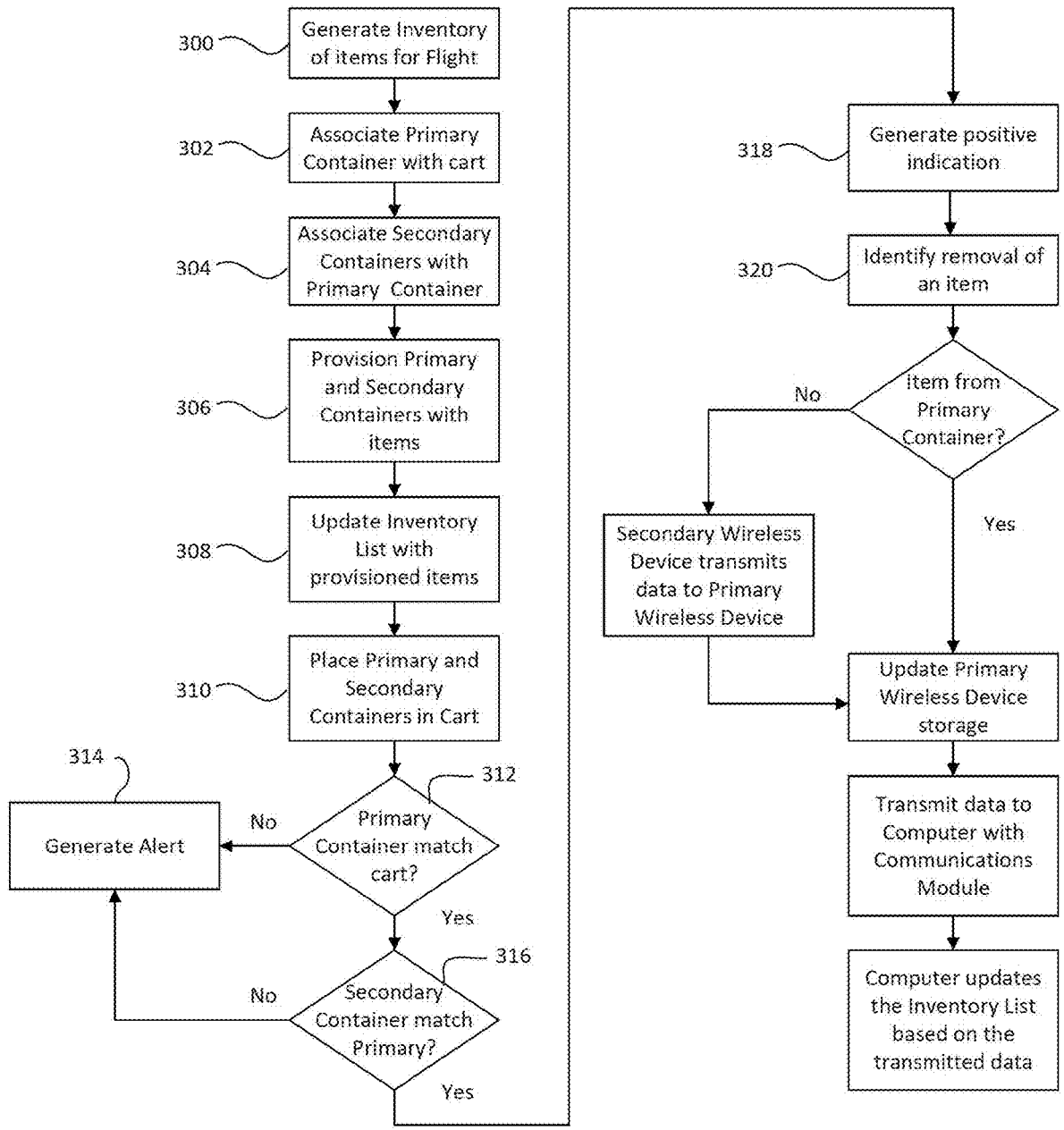
FIG. 9 is a functional flow diagram of the system according to FIG. 1.
Figure 10A:
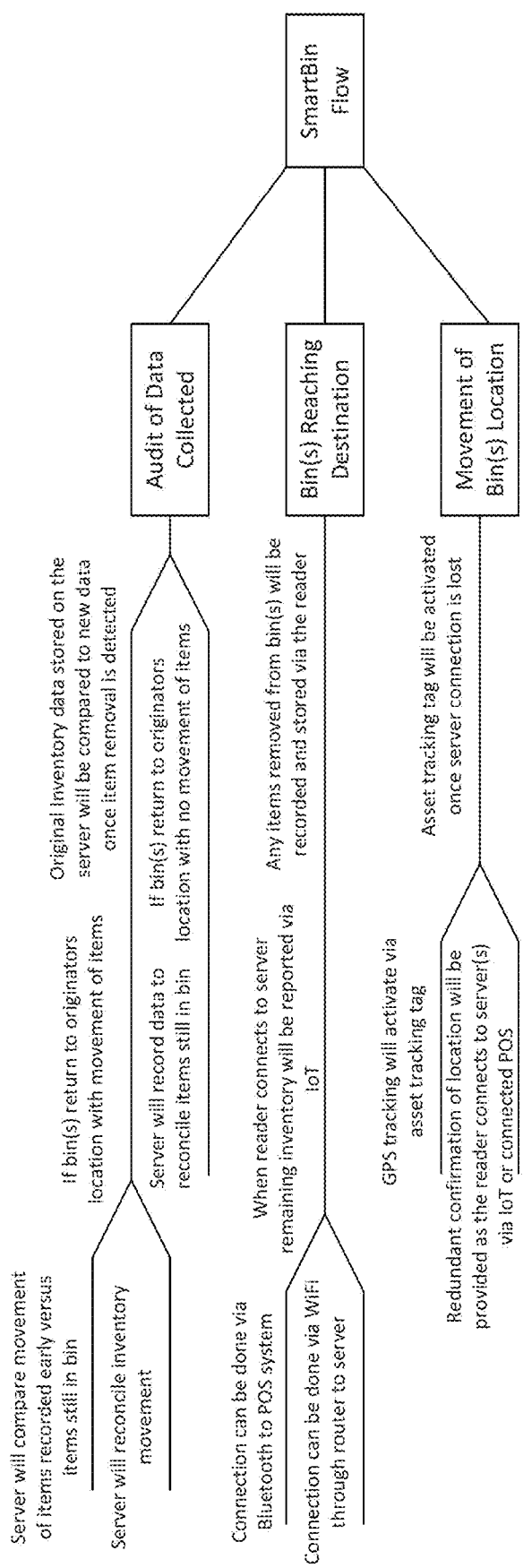
FIGS. 10A and 10B comprises a functional line diagram of the system according to FIG. 1.
Figure 10B:
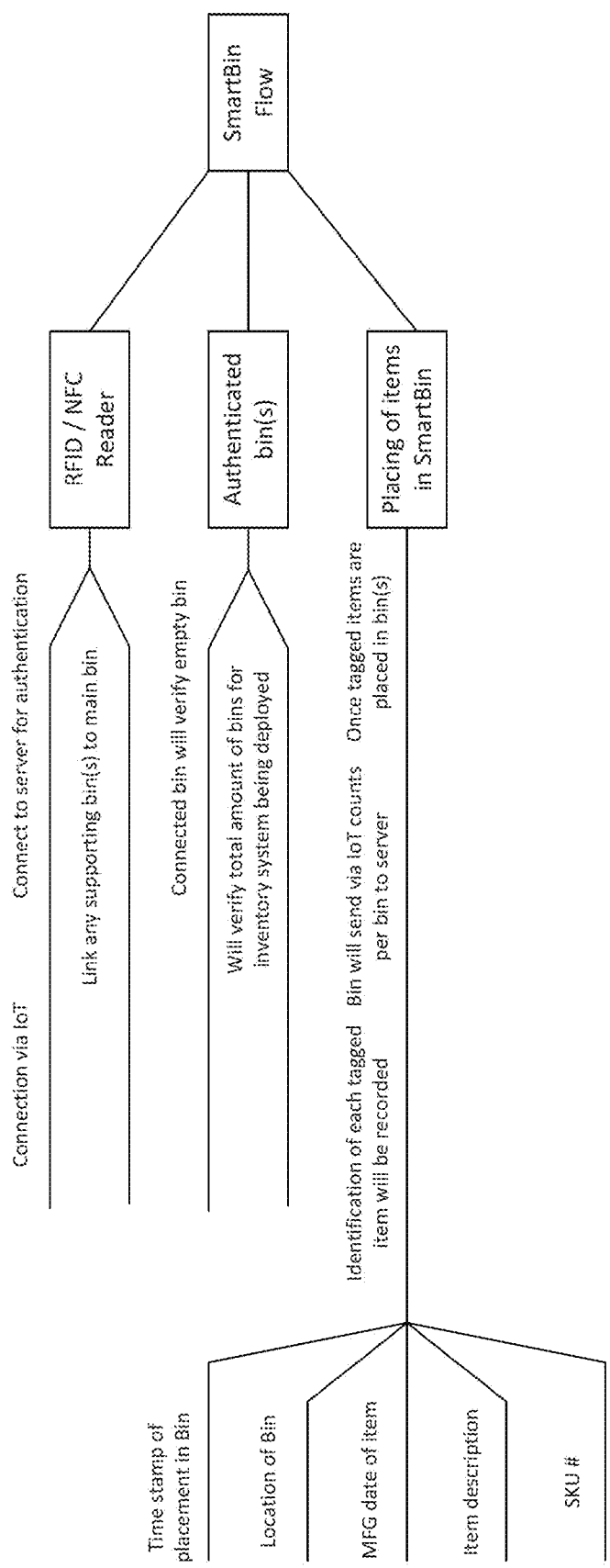

Turning now to FIGS. 9, 10A and 10B, flow and line diagrams are provided illustrating various parts of the operation of system 100. Initially, the system will function to generate an inventory of items for the travel event 300. This may include items that have been pre-ordered and/or pre-purchased. This list may further include items that the carrier believes have a high sale rate such that inclusion of those items will typically result in a sale of the item for the travel event.

Once the list of items for the inventory is generated by the computer 102, the system proceeds to associate the primary container with a cart 302. This will function to tie the particular primary container to a particular cart. From there the system will proceed to associate the secondary containers with the primary container 304. In this way, all of the containers that are to be loaded onto a particular cart have been identified and associated electronically and can be tracked.

At this point, the primary and secondary containers can be provisioned with items. One of skill in the art however, will recognize that the order in which these steps are performed could be modified. While various functions and methods have been described and presented in a sequence of steps, the sequence has been provided merely as an illustration of one advantageous configuration, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

As discussed above, in one configuration, the various containers will be authenticated before having items placed in them verifying a zero count. Additionally, the primary container will be linked to the supporting container system and verify each additional bin's zero counts. Once authenticated, the containers/bins will be linked and encrypted to prevent unauthorized access by outside parties/entities and prevent an accidental coupling to another reader within the reading area that may result in data corruption. It is contemplated that blockchain encryption, i.e., VeChainThor Blockchain in one configuration, may effectively be used to ensure data authenticity and providing reliable data for analysis performing multiple tasks in one transaction using a proof of authority as consensus protocol.

As stated at step 306, tagged items (RFID/NFC tags) will be placed within the container/bin at the originator's location. As items are placed in the container, the system will identify items in real-time utilize IoT and either be manually triggered or with the time-of-flight sensor activation. Each item tagged will register the following but is not limited to the item description, manufactured date, SKU number, timestamp of placement within the container, quantities of particular SKU numbers, bin location, temperature, and freshness. Again, blockchain encryption may be utilized in one configuration, i.e., VeChain ID's encryption, but it should be noted is not limited to that platform. It is contemplated that this will prevent the duplication of RFID/NFC chips as the private key is generated within the hardware and stored in the protected area, making it impossible to access by non-authorized users. IoT devices, which have been verified and equipped with a VeChain ID, can keep track of the entire logistics process by being deployed in the goods themselves, the vehicles used to transport the products, and the warehouses where the products are stored. Temperature, humidity, and location data may be recorded in a real-time manner to ensure the data's authenticity and validity. The data collected may then be stored on the VeChain Blockchain. With the accessible APIs provided by VeChain, the system can upload and search for core information and business data. A digital general ledger will be responsible for setting data standards for the core data generated during logistics and providing third-party verification for the data and the process. Setting data monitoring standards coupled with customers per the business demands and industry requirements, identifying problems promptly, and ensuring the blockchain's stored data are authentic and reliable. Once all items are placed at the originator's location, the system will update the inventory list with provisioned items reconciling and providing a date stamp data. Then data may be sent over IoT, in one configuration, to a mobile purchasing app server to reconcile with the airline's database to verify purchased items by third party as well as identify any pre-ordered items by passengers. In addition, it is conceived that the reconciliation will allow for a push-notice of any items available for purchase to the passenger before a flight via the mobile purchasing app. With the utilization of the VeChain blockchain settlement process, all passenger data will be encrypted and linked to the client's purchases and reconciled against SKU numbers. While various data formats and encryption formats are discussed herein, these are only provided as examples and should not be read as completely inclusive or limiting in any way.

The containers may they be placed within the cart 310 and the system is able to then functionally determine that the containers are in the proper cart. For example, the system will determine if the primary container is in the correct cart 312. If not, the system will proceed to generate and alert 314. This alert could be an audio alert provided locally at the cart, or could be a visual alert such as a red LED illumination on the cart. Additionally, an alert could be transmitted to the computer, which in turn could push an alert out to various mobile devices of those responsible for the provisioning of the carts for the travel event (e.g., the flight attendants and ground personnel).

If the primary container is properly placed in the proper cart, the system then proceeds to determine if the secondary container(s) match with the primary container 316. If not, the system will proceed to generate and alert 314 as described above.

If it is determined that the secondary container(s) are properly placed, the system may proceed to generate a positive indication 318 such as showing a green light on the cart indicating proper container placement in the cart. At this point, the system has determined proper container placement and that all the items to be taken on the travel event are properly located within the various containers.

In one configuration, asset tracking will begin once the computer connection is lost from the lack of connectivity via IoT from the originator's location. The system will go dormant while not in use for a predetermined amount of time by the user. The system is activated via a connection to IoT device or time of flight sensor is triggered, or connection to users POS device or Bluetooth beacon or from step 320 where an item is removed from one of the containers.

The system will look to see if the item that was removed from inventory was removed from the primary container 322, and if yes, the system will update the primary wireless device storage with the data 324. If the item was not taken from the primary container, the system will transmits the data from the secondary wireless device associated with the container from which the item was taken and will transmit that information to the primary wireless device storage 326. The system will then transmit the data to the computer via the communication module 328 allowing for the computer to dynamically update the inventory list 330 as described above allowing for current available items to be displayed to users on their mobile devices.

The detected bins/items will be reconciled against the inventoried items and provide a GPS location of the assets. The data will be stored on the RFID readers onboard memory ready to transfer data via IoT connection or Bluetooth data push to POS device which will connect via IoT to send data via accessible APIs provided by VeChain platform. Once all items pulled are identified, finals counts are reconciled by the end of the flight/travel event, the system will be sent inventory pulls over IoT to the mobile purchasing app server to reconcile with the airline's database to verify items sold and identify inventory turns and identify profitability.

Any items not purchased on the first pass by flight attendants will be reconciled and then may be offered to all passengers via the mobile purchasing app connected to WiFi over IoT and Bluetooth beacons in the users' vicinity. It should be noted that by analyzing the buying patterns of the end-user, particular offers can be tailored to the user via the app. Items will be auto-populated via the mobile purchasing app, allowing the end-user to make order changes or additions without searching for items.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for automatically tracking items to be distributed during a travel event comprising:
   a computer having a database including an inventory of items provisioned into a portable container placed in a vehicle for the travel event, the computer connected to a network;
   a communications module associated with the container and coupled to said computer;
   a wireless device affixed to the container and coupled to said communications module;
   a wireless identifier associated with an item placed within the container, said wireless identifier having information stored thereon;
   wherein when the item is placed into the container, said wireless device automatically communicates with said wireless identifier and the information stored thereon is received by said wireless device;
   said wireless device transmitting ID data related to the wireless identifier information to said communications module;
   said communications module transmitting said ID data to said computer;
   software executing on said computer processing the ID data to update the inventory of items associated with the container for the travel event;
   wherein when the item is removed from the container, said wireless device automatically indicates to the communications module that the item has been removed from the container and data indicating that the item has been removed from the container is transmitted from the communications module to the computer and said software executing on said computer updates the inventory of items associated with the container for the travel event;
   an app that is loadable onto a third party mobile device, wherein, the app presents an inventory list of the items for purchase associated with the container for the travel event on the third party mobile device; and
   wherein the inventory list is updated as items are removed from the container during the travel event and the updated inventory list presented to the third party mobile device such that a current inventory list of items for purchase is presented on the third party mobile device.

2. The system according to claim 1, wherein said wireless identifier comprises a first wireless identifier having first information saved thereon,
   wherein when a second item having a second wireless identifier having second item information saved thereon is placed into the container, said wireless device automatically communicates with said second wireless identifier and the second item information is received by said wireless device;
   said wireless device transmitting said second item information to said communications module;
   said communications module transmitting said second item information to said computer;
   software executing on said computer processing the second item information to update the inventory of items associated with the container for the travel event.

3. The system according to claim 2, wherein the first and second information respectively is selected from the group consisting of: an item description, a manufactured date, a SKU number, a timestamp of placement within the container, and combinations thereof.

4. The system according to claim 1, wherein said wireless device is adapted to function with Radio Frequency Identification (RFID) or Near-Field Communication (NFC).

5. The system according to claim 1, wherein said communication module and said wireless device are integrated into a single physical device.

6. The system according to claim 1, further comprising a cart having a wireless cart identifier, wherein the container is associated with the cart for the travel event.

7. The system according to claim 6, wherein if the container is not associated with the cart within which it is positioned, a warning will be presented indicating the container is not associated with the cart in which it is positioned, the warning selected from the group consisting of: a visual indication, an audio indication and combination thereof.

8. The system according to claim 6, wherein if the container is associated with the cart within which it is positioned, a visual indication will be presented.

9. The system according to claim 1, wherein said wireless device includes a storage.

10. The system according to claim 1, wherein when the item is removed from the container, said wireless device automatically identifies that the wireless identifier has been moved out of range of the wireless device.

11. The system according to claim 1, wherein the inventory list is updated in real time as items are removed from the container during the travel event.

12. The system according to claim 1, wherein the updated inventory list is pushed out to the third party mobile device such that a current inventory list of items for purchase is presented on the third party mobile device.

* * * * *